Dec. 12, 1961    L. DOMENACH    3,013,101
HIGH-POWER, HIGH-VOLTAGE ELECTRIC CABLE INSTALLATION
Filed Oct. 16, 1957    2 Sheets-Sheet 1

INVENTOR
Louis Domenach
By Paul M. Craig, Jr.
Attorney

INVENTOR
Louis Domenach
By Paul M. Craig, Jr.
Attorney

United States Patent Office 3,013,101
Patented Dec. 12, 1961

3,013,101
HIGH-POWER, HIGH-VOLTAGE ELECTRIC CABLE INSTALLATION
Louis Domenach, Lyon, France, assignor to Compagnie Generale d'Electricite, Paris, France, a French corporation
Filed Oct. 16, 1957, Ser. No. 690,520
Claims priority, application France May 21, 1957
14 Claims. (Cl. 174—15)

The present invention relates to an installation for the transmission of high power by means of very high-voltage electric cables, and more particularly to such an installation which enables appropriate cooling of the cable to enable the transmission of greater amounts of power without damage to the insulation thereof.

More and more, high-voltage cables are used for the transmission of high powers over relatively short distances, for example, at the exit of central stations between transformers and overhead lines, or for the lead-in into substations which serve large agglomerations where relatively considerable powers are concentrated over a relatively restricted surface, or still in interconnecting networks which surround great centers of power consummation.

It has already been proposed in the prior art to provide these very high-voltage cables with a forced cooling device to increase the transmission capacity thereof. In the French Patent 875,969, filed October 14, 1941, such cables have been described which include, in the center of the conductor, a tight channel for the passage of a cooling agent or medium.

In the British Patent 491,200 of February 12, 1938, an installation has been described which includes a pipe or conduit surrounding a cable without tight cover or sheath, and in which cooled or refrigerated oil circulates, the return of which takes place by an auxiliary pipe or conduit; however, this arrangement, nevertheless, presents the inconvenience that the circulating oil which has become dirty and oxidized by the internal walls of the pipe, penetrates into the insulating material. In addition thereto, since there is no central channel in the conductor, the cooling takes place exclusively at the outside of the insulating material, and is, therefore, little efficacious since it is in the neighborhood of the conductor that the gradient of temperature is the highest, and that the insulating material has a great thickness in very high-voltage cables.

The United States Patent 2,286,994 of June 16, 1942, describes a cooling arrangement by the circulation of oil in a steel tube or pipe in which are placed the cables, while radiators are disposed from point to point along this pipe. However, this arrangement, as the preceding one, presents the inconvenience that the circulating oil, dirtied by the tube, penetrates into the insulating material of the cable which does not include a tight sheath. Furthermore, this arrangement includes only external cooling.

Finally, the French Patent 1,127,469 of May 27, 1955, filed in the name of the assignee of the present application, is applicable to cables with fluid oil within a lead sheath with circulation of the refrigerating oil at the interior of the central channel of the cable, and a return of the oil by an auxiliary tube which follows the length of the cables.

The present invention has for its object an installation for the transmission of very high powers by means of electric cables comprising a central tight channel and a tight external sheath, and placed into a pressure resistant pipe or conduit, characterized by the fact that the fluid-tight central channel of each cable is in communication, by the intermediary of an insulating tube and a refrigerating device, with the internal space of the pipe, and that a continuous circulation of the fluid is maintained in the circuit thus formed.

Such an installation does not present the inconveniences of the prior art devices described hereinabove; for it permits an efficient cooling of the conductors and of the insulating material of the cables by the cooling oil circulating at the same time in the interior and at the exterior of the cables.

It does not necessitate auxiliary tubes or pipes and the oil of the cooling circuit cannot penetrate into the insulating material, a condition which is indispensable to avoid a prohibitive increase in dielectric losses in cables of very high voltage placed into steel tubes of which the internal wall has not been the object of a special treatment.

The cooling fluid utilized in the arrangement according to the present invention may be of any suitable type since it is nowhere in contact with the insulation of the cable.

Accordingly, it is an object of the present invention to provide an arrangement for high-voltage, high-power electric cables, which effectively cools the same and thereby permits an increase in the transmitted power.

It is another object of the present invention to provide a cooling system and installation for very high-voltage, high-power electric cables which is simultaneously simple in construction, effective for its intended purposes, and without adverse influence on the dielectric characteristics of the cables.

These and other objects, features and advantages of the present invention will become more obvious from the following description when taken in connection with the accompanying drawing which shows, for purposes of illustration only, one embodiment in accordance with the present invention and wherein.

Figure 1:
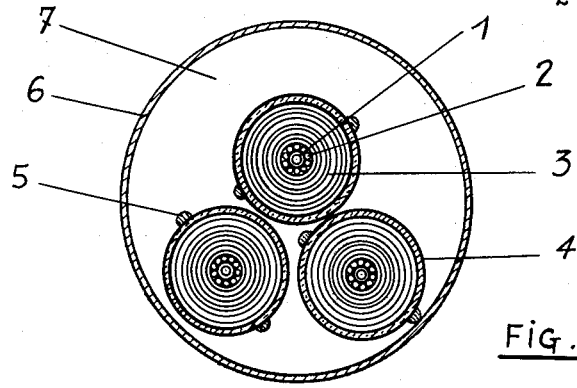
FIGURE 1 is a transverse cross-sectional view through a transmission system according to the present invention.

Referring now to the drawing, wherein like reference numerals are used throughout the various views to designate like parts, and more particularly to FIGURE 1, in which a transmission system with three cables is shown, reference numeral 2 designates the conductors of the three cables of this transmission system, with the individual conductors of each cable placed about a fluid-tight tube 1, which may be of any suitable material such as of metallic or plastic material. The insulation 3 of these cables made of any appropriate material is covered by a sheath 4 made of metal or other synthetic material impervious to the oil, for example, of polyethylene. The usual slide wires 5 intended to facilitate the drawing or emplacement of the cables into the steel tube 6 of usual construction are disposed on the outside of each sheath 4. The free space 7 between the cables and the steel tube 6 is filled with oil under pressure which may attain, for example, 25 kg./cm.$^2$.

The forced cooling takes place, according to the present invention, by circulating the oil, by means of a pump, in the circuit formed by the central channels 1 and the annular channel constituted by the space 7. For that purpose, a communication is established at the extremities of the cable, between the central channels 1 of the conductors and a tube communicating with the steel tube 6 which surrounds the cables.

Figure 2:
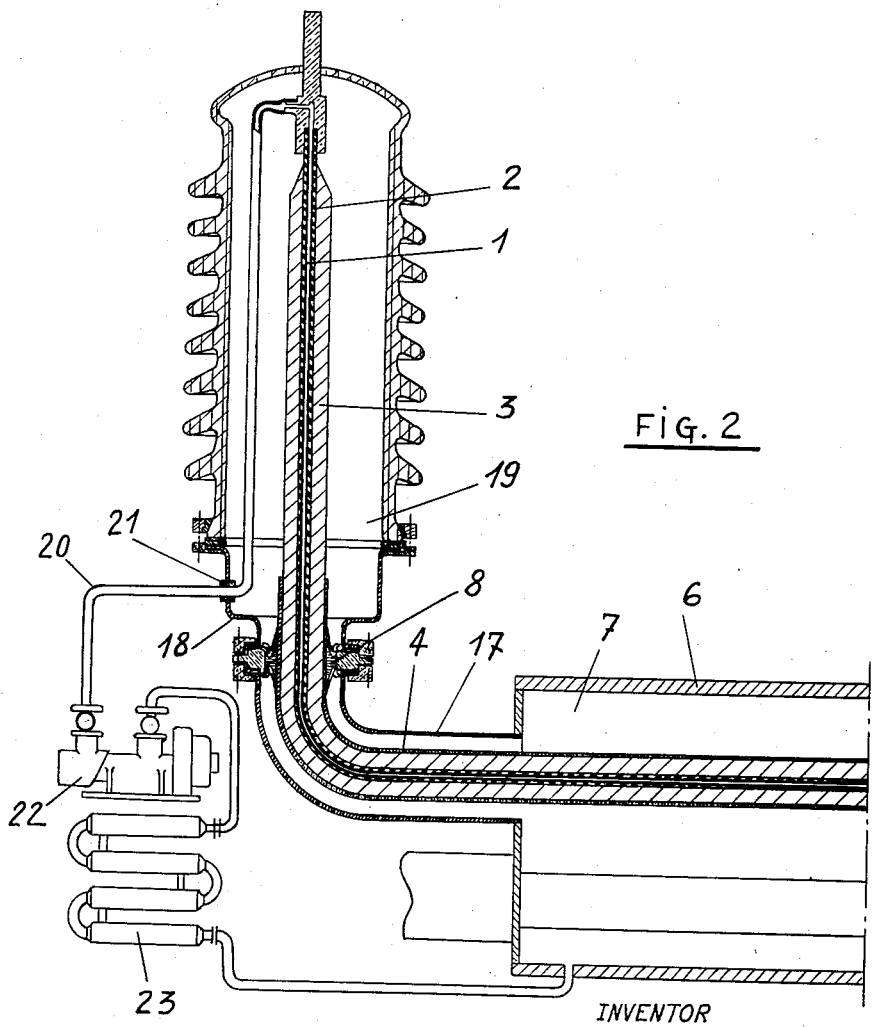
FIGURE 2 is a longitudinal cross-sectional view of the elements disposed at the end of such a transmission system in accordance with the present invention.

FIGURE 2 represents such an arrangement for one extremity of the cable while the other extremity thereof may be constructed in a similar manner. The steel tube 6 which contains the three cables is extended by three metallic tubes such as 17, connected respectively by connecting sleeves 18 to the terminal or end boxes 19. A packing box 8 prevents the cooling oil from entering end box 19 in such a manner as to avoid any mixture between the cooling oil and the insulating oil of the cable which fills the end box 19. Each cable passes through one of these tubes 17, and, in the end box 19 thereof, the central channel 1 thereof is connected with a fluid-tight insulating tube 20 which leaves the connecting sleeve 18 through a fluid-tight coupling 21, in such a manner as to avoid any mixture between the cooling oil and the insulating oil of the cable which fills the end box 19. After leaving the box 19, the tube 20 is connected with a pump 22 of suitable construction and thereupon with a cooling coil 23 of any appropriate cooling device, and is then connected to the free internal space 7 of the steel tube 6. Thus, a continuous circuit is established for the circulation of the cooled oil. At the other end a similar arrangement may be provided with a pump 22 and cooling device 23.

Figure 3:
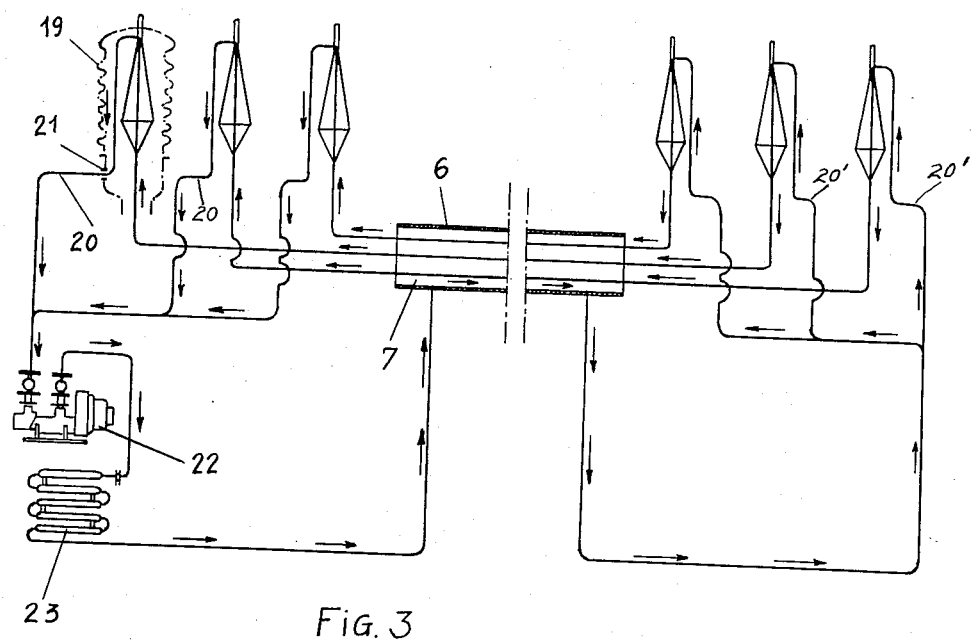
FIGURE 3 is a schematic illustration of a transmission system in accordance with the present invention involving the cooling of three cables passing through a common tube and showing the path of cooling medium at both ends of the system.

In FIGURE 3 there is illustrated schematically the flow paths for the cooling medium in each of the three cables shown in FIGURE 1. The insulating tubes 20 from each of the cables may be connected to the pump 22 whereby the cooling medium is circulated to the cooling coil 23 and thence into the space within the tube 6 around the cables. At the other end of the tube 6, the cooling medium passes from the tube 6 and divides in the insulating tubes 20', corresponding to the insulating tubes 20 at the left end of the system, and is then conducted into the right end of each of the central channels 1 of the cables whereupon it is returned through these channels toward the left as indicated by the arrows.

An analogous circuit could also be provided at each of any stop or terminal joints which might be disposed along the length of the transmission system where, for example, branch lines are interconnected.

The installation described hereinabove enables the transmission of a much higher power than with cables disposed in the usual fashion in steel tubes. For example, by utilizing cables comprising a fluid-tight central channel of 15 mm. in diameter, with a discharge or flow of oil of ten liters per minute in each channel, i.e. 1800 liters per hour for the three cables, a discharge or flow which is relatively slight in order to avoid a vortical or turbulent flow and thereby obtain a loss of fluid pressure or head proportional to the flow, one may dissipate, without exceeding a difference of 35° C. between the temperatures of the oil at the inlet and at the exit of the refrigerant, 1800×35×0.45=28,350 calories per hour, 0.45 being the specific heat of the oil, which corresponds to a power of $$\frac{28{,}350 \times 4{,}186}{3{,}600} = 33{,}000 \text{ watts}$$

For a transmission system of 100 meters of length, one may dissipate 330 watts per meter, and for a transmission system of three cables of 330 meters of length, one may dissipate 33 watts per meter in each cable. If one considers this latter case, it may be found that for a cable at 400 kv., this supplemental cooling of 33 watts per meter, added to the natural or inherent dissipation of the heat by the cable, enables the transmission, with a copper cross section of only 400 mm.$^2$ a power superior by fifty percent to the power transmitted by a cable of the ordinary type comprising a conductive cross section of 1100 mm.$^2$. Consequently, applied to such an arrangement, the present invention enables a saving of 700 mm.$^2$ of copper while simultaneously transmitting a power greater by fifty percent. For a voltage of 220 kv. one could transmit a power of 400 mva. with a conductive cross section of 400 mm.$^2$, which is a gain of thirty-three percent over the power and of 600 mm.$^2$ over the copper for each conductor. In the example considered herein, the flow losses in the cooling circuit formed by the central channels of the three cables and the annular space in the steel tube is of the order of 3 kg./cm.$^2$ per kilometer. It may, therefore, be readily compensated for by means of a pump.

Finally, it should also be noted that the present invention enables the use of voltages higher than 400 kv., for example, 500 to 600 kv., voltages at which the cables could ordinarily not function by reason of the dielectric losses; for these dielectric losses increase as the square of the voltage.

While I have shown and described one preferred embodiment in accordance with the present invention, it is understood that the same is not limited thereto but is susceptible of many changes and modifications within the spirit of the present invention, and I intend to cover all such changes and modifications as encompassed by the appended claims.

I claim:
1. An installation for the transmission of very high powers by high-voltage cables comprising at least one cable comprising an electrically insulated conductor and provided with a fluid-tight central channel for a cooling medium and an external fluid-tight sheath, a pressure-resistant fluid-tight tube accommodating therein said cable and providing therebetween an internal space for the cooling medium, and means for connecting said central channel with the internal space formed in said tube including an insulating tube connected with said central channel for conducting the cooling medium between said channel and said space, refrigerating means for refrigerating the medium circulating through said central channel, said space and said insulating tube, and means for maintaining the circulation of said refrigerated medium.

2. An installation for the transmission of very high powers by high-voltage cables according to claim 1, further comprising terminal boxes located at the ends of said cable and forming part of said connecting means connecting said central channel with the internal space formed in said tube.

3. An installation for the transmission of very high powers by high-voltage cables according to claim 1, further comprising terminal joints for said cable also constituting said connecting means connecting said central channel with said internal space.

4. An installation for the transmission of very high powers by high-voltage cables according to claim 1, wherein said fluid-tight central channel of said cable is made of insulating material.

5. An installation for the transmission of very high powers by high-voltage cables comprising a pressure-resistant fluid-tight conduit made of metal, at least one power transmitting cable disposed within said conduit and including an inner tube forming a fluid-tight central channel, an external fluid-tight sheath, conductive means disposed around said inner tube and insulating means between said conductive means and said external sheath, and means including a terminal box for connecting said central channel with the internal space formed within said conduit around said sheath including an insulating tube connected with said central channel, pump means connected to said insulating tube and a cooling coil connected between said pump means and said internal space whereby the cooling medium is continuously circulated and cooled.

6. An installation according to claim 5, wherein a plurality of said power transmitting cables are disposed in said conduit, and individual connecting means are provided between the central channel of each cable and said internal space of said conduit.

7. A cable system for the transmission of very high powers at high voltages comprising a long pressure-resistant fluid-tight tube, at least one cable extending through said tube, each said cable comprising an electrical conductor and electrical insulation thereabout, said cable being provided with a central channel for a cooling medium in heat transfer relationship with said conductor and including means to provide a fluid-tight impermeable layer between said central channel and said insulation, said cable having a fluid-tight external sheath around said insulation and defining between said sheath and said tube an internal space within the latter for said cooling medium, means for connecting said central channel with said internal space, and means including refrigerating means and a pump for maintaining circulation of a refrigerated cooling medium through said central channel, said connecting means and said internal space.

8. A system according to claim 7 wherein said insulation is impregnated with a fluid medium isolated from said cooling medium.

9. A system according to claim 7 wherein said connecting means includes an insulating tube for said cooling medium between said central channel and said internal space and in series with said pump.

10. A system according to claim 7 wherein one of said connecting means is provided at each end of the system and wherein the means for refrigerating and circulating the cooling medium includes a refrigerating means at each end of the system, the refrigerating means at one end providing refrigeration of the cooling medium entering the internal space thereat and the refrigerating means at the other end providing refrigeration of the cooling medium entering a central channel thereat.

11. A system according to claim 10 wherein the circulating means includes a pump in series with the refrigerating means at each end of the system.

12. A system according to claim 11 wherein said connecting means are provided at each end of the system and include at each end an insulating tube in series with the pump thereat for conducting the cooling medium between the central channel and the internal space thereat.

13. Apparatus for the transmission of very high power at high voltage between two points comprising at least one cable system, each system including a long pressure-resistant fluid-tight tube, at least one cable extending through each said tube, each said cable comprising an electrical conductor and electrical insulation thereabout, said cable being provided with a central channel for a cooling medium in heat transfer relationship with said conductor and including means to provide a fluid-tight impermeable layer between said central channel and said insulation, said cable having a fluid-tight external sheath around said insulation and defining between said sheath and said tube an internal space within the latter for said cooling medium, means for cooling said cables including means for passing a cooling medium longitudinally of each said cable system generally exclusively within each tube through each said central channel and internal space, and means including refrigerating means and pump means for maintaining refrigeration and circulation of the cooling medium through each said internal space and central channel.

14. Apparatus according to claim 13 wherein pump means and refrigerating means for said cooling medium are provided at each end of said system.

References Cited in the file of this patent

UNITED STATES PATENTS

| | | |
|---|---|---|
| 1,651,590 | Fisher | Dec. 6, 1927 |
| 1,834,864 | Phillips | Dec. 1, 1931 |
| 1,849,624 | Hochstadter | Mar. 15, 1932 |
| 1,866,611 | Affel | July 12, 1932 |
| 1,959,338 | Bennett | May 22, 1934 |
| 2,024,144 | Chase | Dec. 17, 1935 |
| 2,095,090 | Aime | Oct. 5, 1937 |
| 2,145,182 | Kirch | Jan. 24, 1939 |
| 2,220,728 | Piercy | Nov. 5, 1940 |
| 2,234,435 | Johnson | Mar. 11, 1941 |
| 2,658,939 | Greenfield | Nov. 10, 1953 |
| 2,668,186 | Domenach et al. | Feb. 2, 1954 |
| 2,686,215 | Fondiller | Aug. 10, 1954 |

FOREIGN PATENTS

| | | |
|---|---|---|
| 439,575 | Great Britain | Dec. 9, 1935 |
| 560,209 | Great Britain | Mar. 24, 1944 |
| 502,011 | Canada | May 4, 1954 |